United States Patent [19]

Mascolo et al.

[11] 4,312,551

[45] Jan. 26, 1982

[54] PIPE FITTING

[75] Inventors: Anthony Mascolo, Islip Terrace; Albert Helrigel, Bay Shore, both of N.Y.

[73] Assignee: Grumman Aerospace Corporation, Bethpage, N.Y.

[21] Appl. No.: 112,849

[22] Filed: Jan. 17, 1980

[51] Int. Cl.³ .............................................. F16L 11/12
[52] U.S. Cl. ............................... 339/14 R; 174/71 R; 174/78; 174/84 S; 339/15 R; 339/95 R; 285/156; 285/370
[58] Field of Search ... 174/78, 84 S, 71 R (U.S. only); 285/156, 150, 370; 361/215; 339/13, 14 R, 14 L, 15

[56] References Cited

U.S. PATENT DOCUMENTS

| 1,365,025 | 1/1921 | Elder | 285/150 X |
| 2,885,461 | 5/1959 | Cafiero | 174/84 S |
| 2,895,560 | 7/1959 | Lynn | 285/156 X |
| 3,778,749 | 12/1973 | Kapell | 174/78 X |
| 4,107,452 | 8/1978 | Razvi | 174/84 S |
| 4,215,384 | 7/1980 | Elson | 174/78 |

FOREIGN PATENT DOCUMENTS

| 660581 | 4/1963 | Canada | 174/78 |
| 663962 | 5/1963 | Canada | 285/156 |
| 588072 | 5/1947 | United Kingdom | 174/78 |
| 820341 | 9/1959 | United Kingdom | 285/156 |

Primary Examiner—Thomas F. Callaghan
Attorney, Agent, or Firm—Mellor A. Gill

[57] ABSTRACT

A pipe fitting fabricated out of an electrically non-conductive material for use in the coupling of pipe sections, the fitting being provided with integral conductor means for bonding, grounding, or shunting purposes. In this design, the conductor is a metal strap or strip which extends across the fitting body to the coupling ends thereof. The bottom portion of the conductor strap is substantially embedded in the wall of the fitting and the exposed surface of the strap is provided with sharp edges or similar means which are used to scrape clean the faying surface in the bore of the pipe when a connection therewith is being made to insure a good electrical contact therebetween.

10 Claims, 8 Drawing Figures

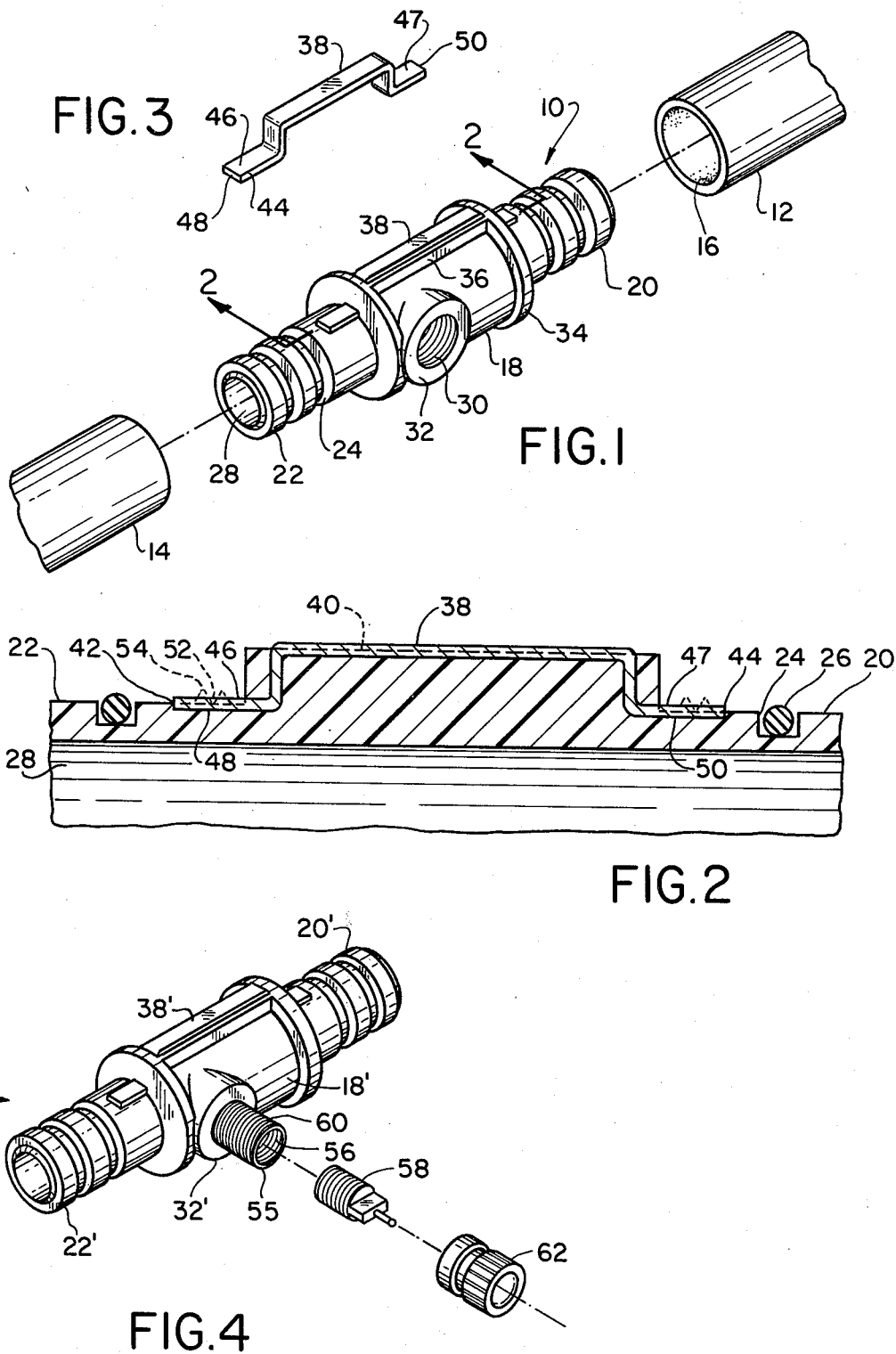

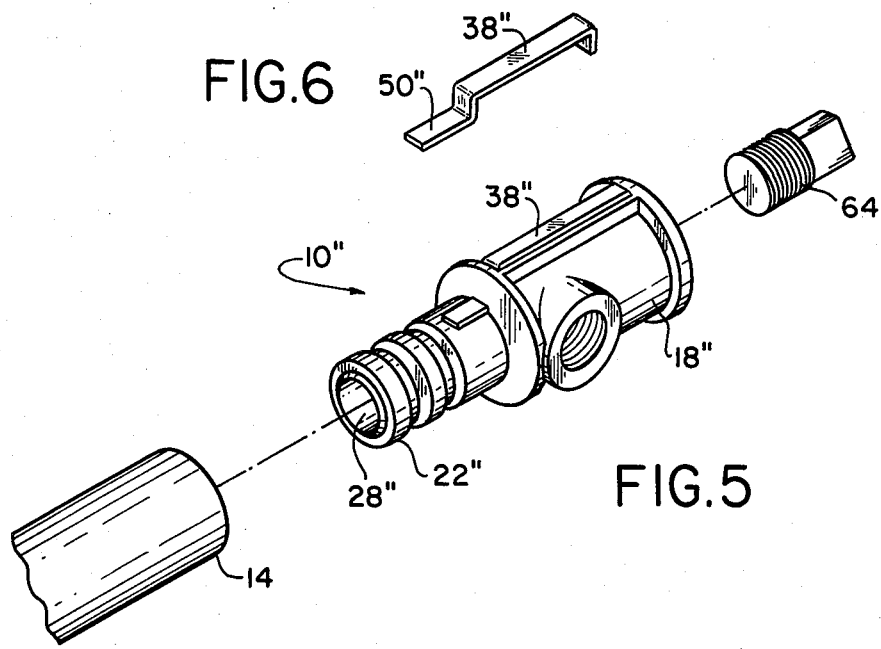
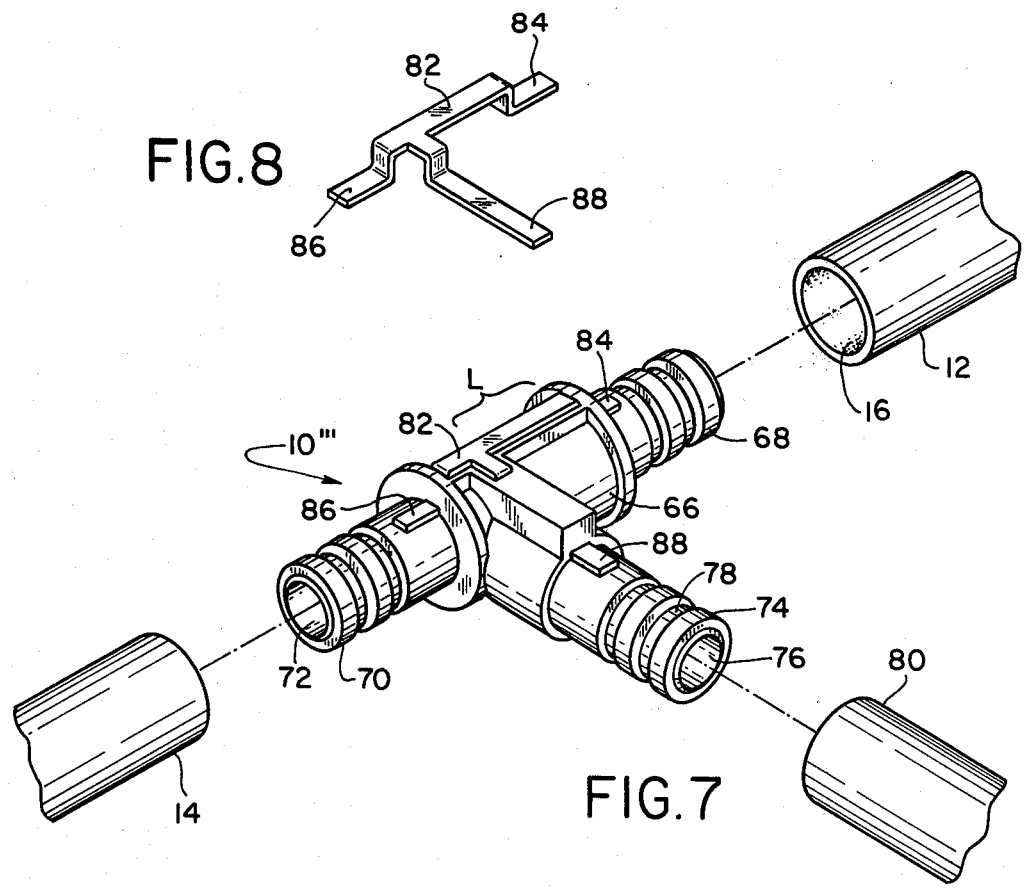

PIPE FITTING

BACKGROUND OF THE INVENTION

1. Field of the Invention

This invention relates to pipe fittings and, more particularly, to a pipe fitting made of an electrically non-conducting material in which conducting means are provided for bonding and grounding purposes or to insure electrical continuity for the pipes being connected by the fitting.

In the field of telephone communications, and particularly with reference to underground installations, much use is made of pressurized cables. The rational for using a pressurized system is that by maintaining cables under pressure, particularly when dry air is used as the working fluid, conductors contained therein are, to a great extent, shielded from the effects of surrounding moisture and fluids permeating the ground through which the cables pass. Specifically, such moisture and fluids are prevented from penetrating pressurized cables by virtue of the pneumatic pressure therein which tends to serve as a barrier against the entry of moisture and other contaminants.

In present day practice, cable pressures are boosted at selected locations, usually manholes, along an underground cable route by manifolding the individual pressurized cables to a paralleling aluminum-lined polyethylene pipe which carries pressurized dry air from an air drier in the central office of the system. By maintaining a relatively high pipe pressure and a high available gas flow through the air pipe, a dry air source, in effect, is produced at the manifold locations in the manholes. The air pipes run between manholes and in each manhole the pipe ends are joined with a special fitting equipped with a threaded port for a pressure testing valve. This valve provides a pressure point for plotting the air pipe gradient, a facility for buffering under special conditions, and a means of providing emergency pressure protection for section replacements.

In general, the pipe fitting of this invention relates to the abovementioned special pipe fitting. Conventionally, these special pipe fittings are fabricated out of stainless steel or a tinned corrosion resistant metal. For reasons of cost and other factors, attempts have been made to replace these metal fittings with fittings made of the presently available tough, non-corrosive plastics. These plastics have proved to be eminently suitable for the purpose, but they have one major drawback; the best plastics for the job are non-conductors of electricity. Because it is a requirement to have a current path through the fitting not only to insure continuity with the aluminum lining of the pipes being connected, but also to reduce galvanic corrosion and to provide means to electrically bond and ground the fitting, it becomes necessary to incorporate a conductor in the fitting so that these functions can be accomplished.

2. Description of the Prior Art

Generally, in the prior art, the problem of providing a conductive path across an electrically non-conducting pipe fitting has been solved by incorporating a metallic conducting sleeve inside the bore of the fitting with the ends of the sleeve projecting out of the coupling ends of the fitting such that electrical contact is made with the aluminum lining of the bores of the pipes being connected. Although this expedient satisfies the requirement for electrical continuity across the fitting, it adds appreciably to the cost thereof and does not solve the problem of providing grounding or bonding means for the fitting. The problem has been met in these prior art fittings by providing a grounding post which penetrates the wall of the fitting and contacts the longitudinal conducting sleeve in the bore thereof. The exterior end of the post is threaded to receive a nut which is used to secure a grounding wire or bonding ribbon on the fitting. These designs have a drawback in that the nut is an extra part and there is always a possibility that it will be lost. Further, in some designs, a crimping tool, not normally carried has to be available to the serviceman for use in installing the air pipe fitting to provide a suitable ground bond connection. In addition, in underground cable service, the aluminum lining of the pipes being connected has a protective coating and the lining also is subject to a build-up of foreign matter; thus, a problem in establishing good electrical contact is presented. This coating and surface build-up has to be removed without, of course, damage to the aluminum lining itself. Preferably, also, there should not be a requirement for a special tool for that purpose. The prior art does not show a fitting that meets the requirements for a rugged, low-cost, non-corrosive fitting nor one provided with means to insure that a good electrical contact is made when pipes are connected.

SUMMARY OF THE INVENTION

This invention is a pipe fitting which is fabricated out of a non-corrosive, electrically non-conducting material, the fitting being provided with integral conductor means for electrically bonding and grounding the pipes being connected. In this design, the conductor is fixed on the outside of the fitting body on a raised rib running longitudinally along the body and the ends of the conductor extend onto the pipe coupling ends of the fitting. The conductor can have a rectangular cross section and the exposed side of at least the end portions thereof can have "sharp" or abrupt edges or similar means such that those edges or means can be used in a twisting motion to scrape clean the lining to insure good electrical continuity when coupling the pipe.

It is thus a principal object of the invention to provide means in a pipe fitting fabricated out of an electrically non-conducting material for insuring electrical continuity across the fitting and also means by which grounding and bonding connections can be made externally with the fitting assembly.

It is another object of the invention to provide means for insuring electrical continuity in a pipe fitting fabricated out of an electrically non-conducting material, which means are an integral part of the fitting such that the need for extra parts therefor or for special tools used in connection therewith are obviated.

A further object of the invention is to provide integral means in a pipe fitting that can be used to remove surface coatings or contamination in the bore of pipes being connected so that good electrical contact between the fitting and pipe is assured.

Still another object of the invention is to provide a reliable, low cost, non-corrosive pipe fitting that can be used in a physically adverse environment.

DESCRIPTION OF THE DRAWINGS

For the purpose of illustrating the invention, there is shown in the drawings the forms which are presently preferred; it should be understood, however, that the invention is not necessarily limited to the precise arrangements here shown.

FIG. 1 is a perspective view of a preferred embodiment of the pipe fitting of our invention shown with the ends of pipes to be connected by the fitting;

FIG. 2 is a fragmentary cross-sectional view taken along line 2—2 of the pipe fitting embodied in FIG. 1;

FIG. 3 is a perspective view of a conductor strap for the pipe fitting embodied in FIG. 1;

FIG. 4 is a perspective view of a further embodiment of the pipe fitting of our invention showing parts thereof in an exploded relationship;

FIG. 5 is a perspective view of yet another embodiment of the pipe fitting of our invention shown with an end plug therefor and the end of a pipe to be connected to the fitting;

FIG. 6 is a perspective view of a conductor strap for the pipe fitting embodied in FIG. 5;

FIG. 7 is a perspective view of still another embodiment of the pipe fitting of our invention shown with the ends of pipes to be connected by the fitting; and FIG. 8 is a perspective view of a conductor strap for the pipe fitting embodied in FIG. 7.

DESCRIPTION OF THE PREFERRED EMBODIMENTS

Having now more particular reference to the drawings, FIG. 1 shows a preferred embodiment of the pipe fitting 10 of our invention. Fitting 10 is particularly suited for use in connecting pipes used for supplying pressurized dry air to underground cable routes used by telephone companies; however, the emphasis on that service herein is in no way intended as implying a limitation thereto. In cable route service, the pipes 12 and 14 being connected are fabricated out of polyethylene and are provided with an aluminum lining 16. This type of pipe is in common use and it is not believed that it would serve any useful purpose to describe it in greater detail. Fitting 10 has a substantially cylindrical body 18 and colinear cylindrical male coupling ends 20 and 22 on either end thereof which fit into the bores of the pipes being connected. Annular grooves 24 can be provided in the outer wall of coupling ends 20 and 22 for O-rings 26 (see FIG. 2) that can be used to seal the pipe connections. A longitudinal bore 28 passing through the coupling ends and body permits the passage of fluid through the fitting. A threaded hole 30 communicating with the bore 28 is cut into a boss 32 formed on the side of the body 18. In telephone service an air valve fitting (not shown) can be installed into threaded hole 30 for supplying air or for testing the system. If not used for those purposes, hole 30 can be sealed off with a suitable threaded plug. The body 18 can be strengthened with annular flanges 34 on either end and by longitudinal ribs 36 on either side thereof.

In this fitting, electrical continuity thereacross is provided by a conductor strap 38 (see FIG. 3) fabricated out of stainless steel or other known electrically conducting material. Preferably, strap 38 is made an integral part of the fitting by being incorporated therein during the manufacturing process. For example, the fitting can be fabricated out of a suitable non-corrosive plastic such as a 40% fiberglass-filled natural-colored nylon, preferably by an injection molding process. As is well known, the strap 38 would be positioned in the injection die and the filled nylon would be injected thereinto, partially embedding the strap (as indicated by broken line 40) in the wall of the fitting body. As shown, the strap extends longitudinally from one coupling end 20 across the body on one of the ribs 36 and terminates on the other coupling end 22. The upper portion 42 of the strap which protrudes from the walls of the body and coupling ends can have sharp or abrupt edges 44 which can be used to scrape off the surface coating or contamination in the bore of the pipe being coupled by the fitting. To facilitate this scraping action, the top surface 46 and 47 of the coupling end portions 48 and 50 of the strap can be roughened in various ways such as piercing the top surface 46 and 47 with a pointed tool to leave an indentation 52 therein with sharp lips or edges 54 as indicated in FIG. 2. Sharp edges 54 would be used to scrape clean the interior surface of the pipe when the pipe connection is made.

In operation, the fitting of our invention is employed in the usual manner except that, after the connection has been made with the coupling end in the bore of the pipe, the fitting is twisted a few degrees about its longitudinal axis so that edges 44 of the strap 38 (or edges 54) scrape clean the mating surface in the bore of the pipe to improve the electrical contact. After the connection has been made, sealing clamps can be installed to clamp positively the pipe ends on the fitting coupling ends in the usual manner.

A further embodiment of the fitting of our invention is illustrated in FIG. 4. As shown, the fitting 10' has a body 18', colinear cylindrical coupling ends 20' and 22', and a conductor strap 38', and the like substantially as described in the FIG. 1 embodiment. Essentially the only difference between this embodiment and that of FIG. 1 is that instead of a threaded hole such as 30 in FIG. 1 being provided in the fitting body for the reception of an air valve fitting, advantage is taken of the flexibility of the injection molding process to mold an integral cylindrical air valve body 55 on a boss 32' of the fitting body 18'. Air valve body 55 has a threaded bore 56 into which a conventional valve core 58 can be screwed and external threads 60 for a valve cap 62 or other fitting.

FIG. 5 illustrates a further embodiment of the fitting of our invention. The FIG. 5 embodiment differs from the FIG. 1 embodiment in that the fitting 10" has only a single coupling end 22" and the other end of the longitudinal bore 28" through the fitting body 18" is threaded (not shown) such that that end can be sealed with a suitable threaded plug 64. Because the fitting 10" has only a single coupling end 22" by which it can be connected, for example, to a pipe 14, its conductor strap 38" has only a single end portion 50" as perhaps best shown in FIG. 6.

A yet further embodiment of the fitting of our invention is illustrated in FIG. 7. With the exception of the fact that this fitting 10''' has three coupling ends, it is essentially similar to fitting 10 of the FIG. 1 embodiment. As shown, fitting 10''' has a body 66 and colinear cylindrical coupling ends 68 and 70 having a longitudinal bore 72 passing therethrough. Normal to the coupling ends 68 and 70 is a third cylindrical coupling end 74 which, in turn, has a longitudinal bore 76 which opens onto bore 72 in the fitting body 66. In common with coupling ends 68 and 70, the third coupling end 74 can be provided with annular grooves 78 that can be used for O-rings to seal the connection to be made with pipe 80. To accommodate the third coupling end, the conductor strap 82 (see FIG. 8) has a T-shaped configuration with three end portions 84, 86, and 88 which extend onto the coupling ends to provide electrical continuity with the pipes connected thereto.

In the FIG. 7 embodiment, the coupling end 74 is not positioned in the longitudinal center of the fitting body 66 (this is true also for boss 32 and the air valve body 55 of the other embodiments) but is offset to one end of the body. This offset is designed to provide an appreciable free length L of the conductor strap to which a bonding or grounding ribbon (not shown) can be secured in electrical contact using a sealing clamp as is the practice with the metal pipe fittings conventionally used in underground telephone service.

Although shown and described in what are believed to be the most practical and preferred embodiments, it is apparent that departures from the specific method and designs described will suggest themselves to those skilled in the art and may be made without departing from the spirit and scope of the invention. We, therefore, do not wish to restrict ourselves to the particular designs illustrated and described, but desire to avail ourselves of all modifications that may fall within the scope of the appended claims.

Having thus described our invention, what we claim is:

1. A pipe fitting for connecting pipes comprising:
   a substantially cylindrical body having at either end thereof co-linear cylindrical male coupling ends that are inserted into the bores at the ends of pipes for connecting said pipes, said body and coupling ends being fabricated out of an electrically non-conductive material;
   a first longitudinal bore through said body and coupling ends for the passage of fluid therethrough; and
   an electrically conductive strap having an intermediate portion and end portions on the outer surface of said fitting extending across said body with said end portions terminating on said coupling ends intermediate the ends thereof, said strap being embedded in the outer surface of said fitting with the upper portion of at least said intermediate and said end portions of said strap protruding therefrom such that said end portions provide electrical contact with the bores of the pipes being connected such that electrical continuity across said fitting is provided by said strap and whereby said intermediate portion is exposed so that grounding and bonding means can be readily clamped thereagainst.

2. The pipe fitting of claim 1 wherein said fitting has a coupling end on one end only of the body and wherein a length of the first longitudinal bore in the other end of said body is provided with threads for the reception of a threaded plug for sealing said end of said bore.

3. The pipe fitting of claim 1 wherein the body thereof has a third cylindrical coupling end normal to the longitudinal axis of the other two coupling ends such that a T-configuration is formed thereby and wherein said third coupling end has a second longitudinal bore therethrough opening onto the first longitudinal bore in said body for the passage of fluid thereto.

4. The pipe fitting of claim 3 wherein the electrically conductive strap has a third leg joined to and normal to the longitudinal portion thereof, said third leg terminating on the third coupling end intermediate the end thereof of such that electrical continuity between said third coupling end and the other two coupling ends is provided.

5. The pipe fitting of claim 1 wherein said fitting has a boss on the side of the body thereof, said boss having a third bore therethrough opening on the first longitudinal bore in said body for the passage of fluid thereto, said third bore being threaded for the reception of a threaded element.

6. The pipe fitting of claim 1 wherein said fitting has a boss on the side of the body thereof, a hollow tubular stem projecting from said boss with the bore thereof opening on the first longitudinal bore in said body for the passage of fluid thereto, said stem being threaded the length of its bore and its outside diameter.

7. The pipe fitting of claim 1 wherein the electrically conductive strap is made of metal.

8. The pipe fitting of claim 7 wherein the electrically conductive strap is provided with means that can be used to scrape the faying surface of a pipe being connected such that the electrical contact therewith is improved.

9. The pipe fitting of claim 8 wherein the scraping means are sharp edges on the strap.

10. The pipe fitting of claim 8 wherein the scraping means are the sharp edges of an indentation made in the outer surface of the strap.

* * * * *